(12) United States Patent
Campbell et al.

(10) Patent No.: US 11,866,609 B2
(45) Date of Patent: Jan. 9, 2024

(54) OPTICALLY CLEAR ADHESIVES CONTAINING A TRIALKYL BORANE COMPLEX INITIATOR AND PHOTOACID

(71) Applicant: 3M INNOVATIVE PROPERTIES COMPANY, St. Paul, MN (US)

(72) Inventors: Christopher J. Campbell, Burnsville, MN (US); John W. Campbell, St. Paul, MN (US); Mark F. Ellis, St. Paul, MN (US); Kathleen S. Shafer, Woodbury, MN (US); Wayne S. Mahoney, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 137 days.

(21) Appl. No.: 16/770,984

(22) PCT Filed: Dec. 10, 2018

(86) PCT No.: PCT/IB2018/059832
§ 371 (c)(1),
(2) Date: Jun. 9, 2020

(87) PCT Pub. No.: WO2019/116201
PCT Pub. Date: Jun. 20, 2019

(65) Prior Publication Data
US 2020/0317956 A1 Oct. 8, 2020

Related U.S. Application Data

(60) Provisional application No. 62/598,222, filed on Dec. 13, 2017.

(51) Int. Cl.
| | | |
|---|---|---|
| *C09D 4/00* | (2006.01) | |
| *B32B 27/30* | (2006.01) | |
| *C08F 2/50* | (2006.01) | |
| *C08K 5/55* | (2006.01) | |
| *C09J 4/00* | (2006.01) | |
| *C08K 5/05* | (2006.01) | |

(52) U.S. Cl.
CPC ............... *C09D 4/00* (2013.01); *B32B 27/30* (2013.01); *C08F 2/50* (2013.01); *C08K 5/05* (2013.01); *C09J 4/00* (2013.01)

(58) Field of Classification Search
CPC ....... C09D 4/00; B32B 27/30; B32B 2250/02; B32B 2307/412; B32B 7/12; B32B 17/06; B32B 23/08; B32B 27/08; B32B 27/308; B32B 27/36; B32B 27/365; B32B 2250/24; B32B 27/32; C08F 2/50; C08F 220/18; C09J 4/00; C09J 7/30; C09J 11/04; C09J 133/04; C09J 2301/312; C09J 2301/416; C08K 5/55
See application file for complete search history.

(56) References Cited

U.S. PATENT DOCUMENTS

| | | |
|---|---|---|
| 2,183,873 A | 12/1939 | Schlichting |
| 4,279,717 A | 7/1981 | Eckberg |
| 5,539,070 A | 7/1996 | Zharov |
| 5,621,143 A | 4/1997 | Pocius |
| 5,691,065 A | 11/1997 | Zharov |
| 5,795,657 A | 8/1998 | Pocius |
| 5,872,197 A | 2/1999 | Deviny |
| 5,990,036 A | 11/1999 | Deviny |
| 6,027,813 A | 2/2000 | Deviny |
| 6,762,260 B2 | 7/2004 | Sonnenschein |
| 6,762,261 B2 | 7/2004 | Deviny |
| 7,927,533 B2 | 4/2011 | Kamiya |
| 8,087,967 B2 | 1/2012 | Shinya |
| 8,371,010 B2 | 2/2013 | Jill |
| 8,628,637 B2 | 1/2014 | Ishii |
| 9,309,443 B2 | 4/2016 | Yurt |
| 2011/0021655 A1 | 1/2011 | Smothers |
| 2011/0035923 A1 | 2/2011 | Jill |
| 2011/0104508 A1 | 5/2011 | Wang |
| 2011/0135923 A1 | 6/2011 | Ahn |
| 2013/0084459 A1 | 4/2013 | Larson |
| 2017/0240771 A1* | 8/2017 | Campbell ............ C08G 18/625 |
| 2017/0247589 A1* | 8/2017 | Branigan ............... C09J 133/10 |

FOREIGN PATENT DOCUMENTS

| | | | |
|---|---|---|---|
| EP | 1029906 | 8/2000 | |
| GB | 2580162 A * | 7/2020 | ............. C09J 11/06 |
| JP | 2013084459 | 5/2013 | |
| WO | WO 2012-071144 | 5/2012 | |
| WO | WO 2012-138675 | 10/2012 | |

(Continued)

OTHER PUBLICATIONS

Crivello, "Photoinitiated Cationic Polymerization by Dialkyl-4-Hydroxyphenylsulfonium Salts", Journal of Polymer Science: Polymer Chemistry Edition, 1980, vol. 18, pp. 1021-1034.
Crivello, "Photoinitiated Cationic Polymerization by Dialkylphenacylsulfonium Salts", Journal of Polymer Science: Polymer Chemistry Edition, 1979, vol. 17, pp. 2877-2892.
Sonnenschein, "Physical and Chemical Probes of the Bond Strength between Trialkylboranes and Amines and Their Utility as Stabilized Free Radical Polymerization Catalysts", Macromolecules, 2006, vol. 39, pp. 2507-2513.
International Search Report for PCT International Application No. PCT/IB2018/059832, dated Apr. 5, 2019, 4 pages.

*Primary Examiner* — Jessica M Roswell
(74) *Attorney, Agent, or Firm* — Jeffrey M. Olofson

(57) ABSTRACT

The present invention is an optically clear adhesive composition including a free-radically polymerizable acrylate or meth(acrylate) functional group oligomer, a trialkyl borane complex initiator, a photoacid generator, and a photosensitizer. A viscosity of the composition immediately after mixing and a viscosity of the composition about 24 hours after mixing changes by less than about 10%.

19 Claims, 1 Drawing Sheet

(56) References Cited

FOREIGN PATENT DOCUMENTS

| WO | WO 2013-111810 | 8/2013 |
| WO | WO 2016-044151 | 3/2016 |
| WO | WO 2016-053877 | 4/2016 |

\* cited by examiner

OPTICALLY CLEAR ADHESIVES CONTAINING A TRIALKYL BORANE COMPLEX INITIATOR AND PHOTOACID

FIELD OF THE INVENTION

The present invention is related generally to the field of optically clear adhesives. In particular, the present invention is related to optically clear adhesives containing a trialkyl borane complex initiator and a photoacid.

BACKGROUND

Optically clear adhesives in liquid format (LOCA) have become very prevalent in the display industry to fill the air gap between the cover lens and touch sensors, between touch sensors and the liquid crystal module, and/or directly between the cover lens and the liquid crystal module. Cross-sectional views of potential display configurations are illustrated in FIGS. 1A and 1B. In FIG. 1A, the LOCA 10 is positioned between the cover lens 12 and touch sensor 14 as well as between the touch sensor 14 and the liquid crystal display (LCD) 16. In FIG. 1B, the LOCA 10 is positioned between the cover lens 12 and touch sensor 14. An ink step 18 is present under the cover lens 12 in both configurations.

Most LOCAs are UV curable acrylates and/or silicone resins. The constructions are typically built from the front/top of the display backwards, such that the cover lens (with a light obscuring ink step) is bonded to a touch sensor, and then that stack is subsequently bonded to the LCD module and/or AMOLED stack. For optical reliability and display performance, it is critical to cure all of the liquid optically clear adhesive—even those coated outside the viewing area and under the ink step—to prevent display defects such as yellow mura and light leakage, or cosmetic defects such as oozing. While a UV transparent ink could be used (see for example, WO2012/071144), it is not a common practice in the industry. Quite often the light obscuring ink step does not transmit UV light, leading to insufficient and/or no cure under the ink step.

To provide cure under the ink step, one method is to pre-cure the adhesive prior to lamination (see for example. U.S. Pat. No. 8,628,637 or WO2013/111810). However, this can lead to a loss in adhesion performance and display defects (e.g. yellow mura and light leakage) caused by either coating defects (e.g. picture framing) and/or poor lamination. Alternatively, a secondary cure such as by using a thermal initiator (as described, for example, in U.S. Pat. No. 8,087,967 or US2011/021655), can be used to cure the area under the ink step. However, this requires additional equipment, such as a heat oven, and exposes the display stack to temperatures of greater than 60° C. to achieve cure. Most display manufacturers do not want to expose liquid crystal modules to temperatures of greater than 40° C. Finally, irradiation from the side (as described in, for example U.S. Pat. No. 7,927,533), under the ink step can be used to attempt to cure the LOCA. This method requires painstaking alignment aiming for a 100 µm thick LOCA layer and may not be able to achieve the necessary depth of cure and/or cure through flex circuitry or other items obscuring cure from the side, especially present in in-cell constructions where a flex tail may be coming off of the top side of the display.

SUMMARY

In one embodiment, the present invention is an optically clear adhesive composition including a free-radically polymerizable acrylate or meth(acrylate) functional group oligomer, a trialkyl borane complex initiator, a photoacid generator, and a photosensitizer. The viscosity of the composition immediately after mixing and a viscosity of the composition about 24 hours after mixing changes by less than about 10%.

In another embodiment, the present invention is a method of curing under an ink step. The method includes positioning an optically clear adhesive composition at least partially beneath the ink step and exposing the optically clear adhesive composition to actinic radiation to cure the optically clear adhesive composition under the ink step. The optically clear adhesive composition includes a free-radically polymerizable acrylate or meth(acrylate) functional group oligomer, a trialkyl borane complex initiator, a photoacid generator, and a photosensitizer. The viscosity of the composition immediately after mixing and a viscosity of the composition about 24 hours after mixing changes by less than about 10%.

In yet another embodiment, the present invention is a laminate including a first substrate, a second substrate, and an optically clear adhesive composition positioned between and in contact with the first substrate and the second substrate. The optically clear adhesive layer is derived from precursors that include a free-radically polymerizable acrylate or meth(acrylate) functional group oligomer, a trialkyl borane complex initiator, a photoacid generator, and a photosensitizer. The viscosity of the composition immediately after mixing and a viscosity of the composition about 24 hours after mixing changes by less than about 10%.

DETAILED DESCRIPTION

Figure 1A:
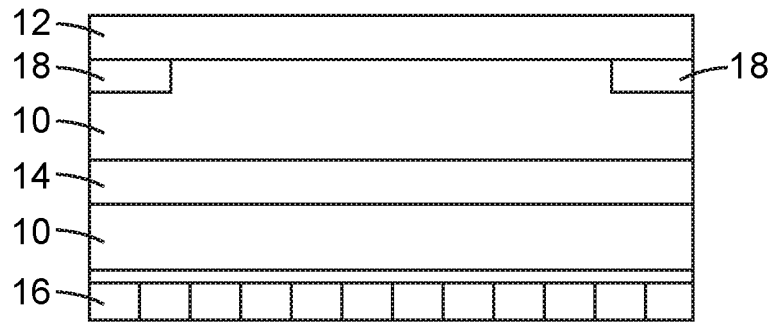
FIG. 1A shows a cross-sectional view of a first configuration for the use of liquid optically clear adhesives in a prior art display application.
Figure 1B:
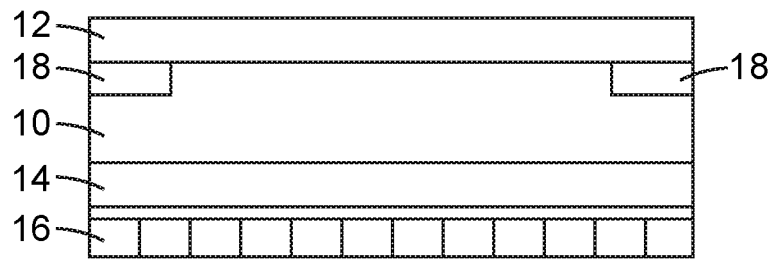
FIG. 1B shows a cross-sectional view of a second configuration for the use of liquid optically clear adhesives in a prior art display application.

The present invention is an optically clear adhesive composition, a laminate including the optically clear adhesive composition, and a method of curing under an ink step using the optically clear adhesive composition. The optically clear adhesive composition generally includes a free-radically polymerizable acrylate or meth(acrylate) functional group oligomer, a trialkyl borane complex initiator, a photoacid generator, and a photosensitizer. The optically clear adhesive composition is a one-part system in which trialkyl borane is initially protected with primary amines. When the composition is activated with actinic radiation, such as ultraviolet (UV) light, the photoacid generator generates a superacid and the primary amines are decomplexed from the trialkyl borane, enabling the trialkyl borane to react with the acrylate or (meth)acrylate group oligomers in the composition to initiate free radical polymerization to the (meth)acrylate group oligomers. The photoacid generator can be activated in a transparent area of a display construction (e.g. an area where light is not obscured by an ink mask) and yet cure a light obscured area of the display construction (e.g., under an ink mask).

The optically clear adhesive composition can be in the form of a liquid optically clear adhesive or a post-UV curable optically clear adhesive film. As used herein, the term "optically clear" refers to a material that has a luminous transmission of greater than about 80% and particularly greater than about 90%, a haze of less than about 5% and particularly less than about 2%, and an opacity of less than about 1% in the 400 to 700 nm wavelength range. Both the luminous transmission and the haze can be determined using, for example, ASTM-D 1003-95. Typically, the optically clear adhesive is visually free of bubbles.

The acrylate and (meth)acrylate functional groups are incorporated as free-radically polymerizable groups that are necessary to have the liquid adhesive react (free-radically polymerize) to transform from a liquid state to a solid state. In one embodiment, the optically clear adhesive composition includes between about 20 wt % and about 100 wt % free-radically polymerizable acrylate or meth(acrylate) functional group oligomer, particularly between about 50 wt % and about 99 wt % free-radically polymerizable acrylate or meth(acrylate) functional group oligomer, and more particularly between about 90 wt % and about 99 wt % free-radically polymerizable acrylate or meth(acrylate) functional group oligomer. Examples of suitable free-radically polymerizable acrylate or meth(acrylate) functional group oligomers include, but are not limited to, those disclosed in U.S. Pat. No. 9,309,443, which is hereby incorporated by reference.

The trialkyl borane complex initiator is formed by the combination of a trialkyl borane and an amine and is a component of the free radical initiator. The stabilization of trialkyl boranes with amines to give stabilized free-radical polymerization initiators has been described, for example, in Macromolecules 2006, Vol. 39, 2507-2513. The amines can be monofunctional or polyfunctional, and can be aromatic amines, aliphatic amines, or mixed. As mentioned above, the trialkyl borane is initially protected with the primary amines. An example of one commonly used amine is 1,3-diaminopropane. In one embodiment, the optically clear adhesive composition includes between about 0.01 wt % and about 10 wt % trialkyl borane complex initiator particularly between about 0.01 wt % and about 5 wt % trialkyl borane complex initiator, and more particularly between about 0.01 wt % and about 2 wt % trialkyl borane complex initiator. Examples of suitable trialkyl borane complexes include, but are not limited to, trialkylborane-amine complex initiators.

The photoacid generator of the optically clear adhesive generates a superacid upon exposure to actinic radiation. Photoacid generators are generally known, and reference may be made to K. Dietliker, Chemistry and Technology of UV and EB Formulation for Coatings, Inks and Paints, vol. III, SITA Technology Ltd., London, 1991, which is hereby incorporated by reference. Further reference may be made to Crivello J. V. (1984) Cationic polymerization—Iodonium and sulfonium salt photoinitiators. In: Initiators Poly-Reactions—Optical Activity. Advances in Polymer Science, vol 62. Springer, Berlin, Heidelberg, which is also hereby incorporated by reference. "Actinic radiation" means photochemically active radiation and particle beams, including electromagnetic radiation, for example, microwaves, infrared radiation, visible light, ultraviolet light, X-rays, and gamma-rays. In some embodiments, actinic radiation having a wavelength between about 200 and about 800 nm may be used and particularly actinic radiation having a wavelength between about 200 and about 400 nm. The superacid then reacts with the primary amines, allowing the primary amines to be decomplexed from the trialkyl borane and enabling the trialkyl borane to react with the acrylate or (meth)acrylate group oligomers in the composition to initiate free radical polymerization of the (meth)acrylate group oligomers.

When the composition is activated with actinic radiation, the photoacid generator generates a superacid and the primary amines are decomplexed from the trialkyl borane, enabling the trialkyl borane to react with the acrylate or (meth)acrylate group oligomers in the composition. This reaction initiates free radical polymerization of the (meth) acrylate group oligomers. In one embodiment, the optically clear adhesive composition includes between about 0.01 wt % and about 10 wt % photoacid generator, particularly between about 0.01 wt % and about 5 wt % photoacid generator, and more particularly between about 0.01 wt % and about 2 wt % photoacid generator. Examples of suitable photoacid generators include, but are not limited to: iodonium and sulfonium salts, such as diaryliodonium, triarylsulfonium, dialkylphenacylsulfonium and dialkyl-4-hydroxyphenylsulfonium salts.

Useful iodonium salt photoacid generators include, but are not limited to: bis(4-t-butylphenyl) iodonium hexafluoroantimonate (e.g., FP5034™ from Hampford Research Inc., Stratford, CT), bis(4-tert-butylphenyl) iodonium hexafluorophosphate (e.g., FP5035™ from Hampford Research Inc., Stratford, CT), (4-methoxyphenyl)phenyl iodonium triflate, bis(4-tert-butylphenyl) iodonium camphorsulfonate, bis(4-tert-butylphenyl) iodonium hexafluoroantimonate, bis(4-tert-butylphenyl) iodonium hexafluorophosphate, bis(4-tert-butylphenyl) iodonium tetraphenylborate, bis(4-tert-butylphenyl) iodonium tosylate, bis(4-tert-butylphenyl) iodonium triflate, (4-octyloxyphenyl)phenyl iodonium hexafluorophosphate (e.g., FP5384™ from Hampford Research Inc., Stratford, CT), (4-octyloxyphenyl)phenyl iodonium hexafluoroantimonate (e.g., FP5386™ from Hampford Research Inc., Stratford, CT), (4-isopropylphenyl)(4-methylphenyl)iodonium tetrakis(pentafluorophenyl) borate (e.g., Rhodorsil 2074™ from Bluestar Silicones, East Brunswick, NJ), bis(4-methylphenyl) iodonium hexafluorophosphate (e.g., Omnicat 440™ from IGM Resins Bartlett, IL), and 4-(2-hydroxy-1-tetradecycloxy)phenyl]phenyl iodonium hexafluoroantimonate.

Useful sulfonium salt photoacid generators include, but are not limited to: diphenyl(4-phenylthio)phenyl sulfonium hexafluorophosphate, bis(4-diphenylsulfonium phenyl)sulfide bis-(hexafluorophosphate), diphenyl(4-phenylthio)phenyl sulfonium hexafluoroantimonate, bis(4-diphenylsulfonium phenyl)sulfide bis-(hexafluoroantimonate), and blends of these triarylsulfonium salts available from Synasia, Metuchen, NJ under the trade designations of UVI-6992™ and UVI-6976™ for the $PF_6$ and $SbF_6$ salts, respectively. Other useful sulfonium salt include, but are not limited to: triphenyl sulfonium hexafluoroantimonate (e.g., CT-548™ from Chitec Technology Corp. Taipei, Taiwan), diphenyl(4-phenylthio)phenyl sulfonium hexafluorophosphate (e.g., CPI-100 from San-Apro Limited, Tokyo Japan), and diphenyl(4-phenylthio)phenyl sulfonium $[(R_f)_nPF_{6-n}]$, where $R_f$ is a perfluorinated alkyl group (e.g., CPI-200 from San-Apro Limited, Tokyo Japan).

Useful dialkylphenacylsulfonium salt photoacid generators have been described by Crivello. J. V. and Lam, J. H. W. in J. Polym. Sci. Polym. Chem. Ed. 17, 2877 (1979), and an example would be of phenacyltetramethylenesulfonium hexafluorophosphate.

Useful dialkyl-4-hydroxyphenylsulfonium salt photoacid generators have been described by Crivello, J. V. and Lam. J. H. W. in J. Polym. Sci. Polym. Chem. Ed. 18, 1021 (1980), and an example would be dimethyl-3,5-dimethyl-4-hydroxyphenylsulfonium hexafluoroantimonate.

Non-limiting examples of anions complexed with any of the onium salts cations described above are: $^-BF_4$, $^-AsF_6$, $^-PF_6$, $^-SbF_6$, $^-C(SO_2CF_3)_3$, $^-CH(SO_2CF_3)_2$, $^-B(C_6H_5)_4$, $^-B(C_6F_5)_4$ and $^-[(R_f)_nPF_{6-n}]$, where $R_f$ is a perfluorinated alkyl group.

Examples of suitable superacids include, but are not limited to: fluoroantimonic acid ($HSbF_6$), hexafluorophosphoric acid ($HPF_6$), perfluorinate tetraphenyl boric acid ($HB(C_6F_5)_4$), tris-(trifluoromethylsulfonyl)methane (HC$(SO_2CF_3)_3$), trifluoromethanesulfonic acid (CF3SO3H), also known as triflic acid, and fluorosulfuric acid (HSO3F).

In one embodiment, the optically clear adhesive composition includes a photosensitizer, which can absorb light and transfer energy or an electron to the photoacid generator. Typically, the optically clear adhesive composition can include between about 0.01 wt % and about 5 wt % photosensitizer, particularly between about 0.01 wt % and about 2 wt % photosensitizer, and more particularly between about 0.01 wt % and about 1 wt % photosensitizer. Examples of suitable photosensitizers include, but are not limited to: substituted and unsubstituted benzophenone, camphorquinone, and thioxanthone compounds, substituted and unsubstituted polynuclear aromatic hydrocarbons such as anthracene and perylene, coumarin and ketocoumarin derivatives, as well as traditional free-radical photoinitiators such as benzoin derivatives benzoin and its derivatives such as alpha-methylbenzoin; alpha-phenylbenzoin; alpha-allylbenzoin; alpha-benzylbenzoin; benzoin ethers such as benzil dimethyl ketal (e.g., OMNIRAD 651 from IGM Resins USA Inc., Charlotte, North Carolina), benzoin methyl ether, benzoin ethyl ether, benzoin n-butyl ether; acetophenone and its derivatives such as 2-hydroxy-2-methyl-1-phenyl-1-propanone (e.g., OMNIRAD 1173 from IGM Resins USA Inc.) and 1-hydroxycyclohexyl phenyl ketone (e.g., OMNIRAD 184 from IGM Resins USA Inc.). Other free-radical photoinitiators that can act as sensitizers include acylphosphine oxide derivatives such as ethyl-2,4,6-trimethylbenzoylphenyl phosphinate (e.g., OMNIRAD TPO-L from IGM Resins USA Inc.), and bis-(2,4,6-trimethylbenzoyl)-phenylphosphine oxide (e.g., OMNIRAD 819 from IGM Resins USA Inc.)

Other materials can be added to the optically clear adhesive composition for special purposes, including, for example: thermal or photoinitiators, cross-linkers, tackifiers, molecular weight control agents, coupling agent, oils, plasticizers, antioxidants, UV stabilizers, UV absorbers, pigments, catalysts, curing agents, polymer additives, nanoparticles, and other additives. These other materials can be added to the optically clear adhesive composition, provided that they do not significantly reduce the optical clarity of the assembly layer after polymerization and coating. As used herein, the term "optically clear" refers to a material that has a luminous transmission of greater than about 90%, a haze of less than about 2%, and opacity of less than about 1% in the 400 to 700 nm wavelength range. Both the luminous transmission and the haze can be determined using, for example, ASTM-D 1003-92. Typically, the optically clear assembly layer is visually free of bubbles.

The presence of monomers or low molecular weight reactive species in the optically clear adhesive composition can cause early polymerization. Thus, in one embodiment, the optically clear adhesive composition is substantially free of monomer. In another embodiment, the optically clear adhesive composition is substantially free of low molecular weight reactive species. In yet another embodiment, the optically clear adhesive composition is substantially free of monomer and low molecular weight reactive species. "Substantially free" as used in this specification means less than about 5 wt %, particularly less than about 2 wt %, more particularly less than about 1 wt %, and most particularly less than about 0.5 wt %.

The viscosity of the optically clear adhesive composition immediately after mixing the components together and after about 24 hours changes by less than about 10%, particularly less than about 5%, and particularly less than about 1%. The less than 10% or more change in viscosity indicates that the composition is not gelling/polymerizing early and has reliable shelf stability.

The present invention is also a laminate including the optically clear adhesive composition. A laminate is defined as a multi-layer composite of at least one optically clear adhesive composition sandwiched between two substrate layers or multiples thereof. In one embodiment, the laminate includes a first substrate, a second substrate, and the optically clear adhesive composition positioned between and in contact with the first substrate and the second substrate. In one embodiment, at least one of the first and second substrates is optically clear. In one embodiment, when the optically clear adhesive composition is placed between two substrates and made into a laminate, wherein at least one of the substrates is transparent, the laminate has a haze of less than about 5%, a transmission of greater than about 80%, and an optical clarity of greater than about 95% when cured.

In one embodiment, the substrates can be glass, COP, PET, PMMA, polycarbonate, polarizers (e.g. TAC surface), etc.

The laminate has at least one of the following properties: optical transmissivity over a useful lifetime of the article in which it is used, the ability to maintain a sufficient bond strength between layers of the article in which it is used, resistance or avoidance of delamination, and resistance to bubbling over a useful lifetime. The resistance to bubble formation and retention of optical transmissivity can be evaluated using accelerated aging tests. In an accelerated aging test, the optically clear adhesive composition is positioned between two substrates. The resulting laminate is then exposed to elevated temperatures often combined with elevated humidity for a period of time. Even after exposure to elevated temperature and humidity, the laminate, including the optically clear adhesive composition, will retain optical clarity. For example, the laminate including the optically clear adhesive composition remains optically clear after aging at 70° C. and 90% relative humidity for approximately 72 hours and subsequently cooling to room temperature. After aging, the average transmission of the adhesive between 400 nanometers (nm) and 700 nm is greater than about 80% and particularly greater than about 90% and the haze is less than about 5% and particularly less than about 2%.

The present invention also includes a method of curing under an ink step. The method includes positioning the optically clear adhesive composition at least partially beneath the ink step and exposing the optically clear adhesive composition to actinic radiation. When the optically clear adhesive composition of the present invention, is exposed to the actinic radiation, the optically clear adhesive composition is cured not only in transparent areas where there is no blockage of light, but also under the ink step.

Examples

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

TABLE 1

Materials

| Designator | Function | Name | Source |
|---|---|---|---|
| VAZO 52 | Thermal Initiator | 2,2'-azobis(2,4 dimethylpentanenitrile) | The Chemours Co., Wilmington, DE |
| VAZO 67 | Thermal Initiator | 2,2'-azobis(2-methylbutanenitrile) | The Chemours Co., Wilmington, DE |
| VAZO 88 | Thermal Initiator | 2,2'-azobis(cyclohexanecarbonitrile) | The Chemours Co., Wilmington, DE |
| MEHQ | Stabilizer | 4-methoxyphenol | Sigma-Aldrich, St. Louis, MO |
| 2-EHA | Monomer | 2-ethylhexyl acrylate | BASF, Florham Park, NJ |
| 2-HEA | Monomer | 2-hydroxyethyl acrylate | Dow Chemical Co., Midland, MI |
| IBOA | Monomer | Isobornyl acrylate | Sartomer Americas, Exton, PA |
| IOTG | Chain transfer agent | Isooctyl thiolglycolate | Evans Chemetics LP, Teaneck, NJ. |
| IEM | Monomer | Isocyanatoethyl methacrylate | Showa Denko, Tokyo, Japan |
| BHT | Stabilizer | Butylated hydroxytoluene | Oxiris Chemicals SA, Barcelona, Spain |
| ITX | Sensitizer | Isopropylthioxanthone | Millipore Sigma, St. Louis, MO |
| TEB-DAP | Thermal Initiator | Triethylamineborane-1,3-diaminopropane | BASF, Florham Park, NJ |
| Omnirad 651 | Radical Photoinitiator | 2,2-dimethoxy-1,2-di(phenyl)ethanone | IGM Resins USA, Charlotte, NC |
| RHODORSIL 2074 | Cationic Photoinitiator | (4-(1-methylethyl)phenyl)(4-methylphenyl) iodonium tetrakis-(pentafluorophenyl) borate | Bluestar Silicones, Rock Hill, SC |
| OPPI | Cationic Photoinitiator | (4-octyloxyphenyl) phenyliodonium hexafluoroantimonate | Hampford Research, Inc., Stratford, CT |
| n/a | Cationic Photoinitiator | Bis-(4-dodecylphenyl) iodonium hexafluoroantimonate | 3M MRD (as described in Example 4 of U.S. Pat. No. 4,279,717 (Eckberg, R. P. and LaRochelle, R. W.) |

Test Methods

Cure Analysis of LOCA with FTIR

A sample for FTIR cure analysis was prepared by applying a 0.031 inch (0.794 mm) thick rubber silicone spacer (Lot 177573, #DSP7038GP-010-36, -70 DUROMETER red specification grade from Diversified Silicone Products, Santa Fe, California) with a 15 mm diameter circle removed from the middle on top of a 1 inch (25 mm)×3 inch (76 mm)×0.04 inch (1 mm) glass microscope slide. About a 150 μL drop of LOCA was applied to the center of the circle, and then a second microscope slide (2 inch (51 mm)×3 inches (76 mm)×0.04 inch (1 mm)) was placed on top of the rubber silicone spacer 100 and LOCA. The assembly was then clamped together with binder clips. The LOCA filled the entire area of the circle.

Real-time IR analysis was conducted using a Nicolet Nexus 670 FTIR (Thermo Scientific, Waltham, MA), with a 385 nm LED light source (Omnicure LX400 from Excelitas Technologies Corp., Waltham MA Conversion of the acrylate double-bonds was determined by analyzing the near IR region (peak of interest at approximately 6200 $cm^{-1}$, —CH stretch). Parameters for the software in the collect tab were set to 32 scans, a resolution of 16 and final format in absorbance. Further parameters were set within the Bench tab, sample compartment to main, detector to MCT/A, a KBr beam splitter was selected, source was IR, accessory was selected to be transmission E.S.P., a gain of 1, velocity was set to 3.7974 and aperture to 32. A background spectra was collected every 100 minutes and baseline spectra were measured prior to UV exposure, as well as post spectra after UV exposure.

Cure Propagation of Unexposed Portions Via FTIR

To determine cure under a light obscuring region (i.e. black mask), a 0.031 inch (0.794 mm) thick rubber gasket that was 2 mm wide was placed on top of a microscope slide. The gasket was filled with LOCA. A microscope slide was then covered with black tape over the entire area, except for a 3 mm by 6 mm window, and placed on top of the rubber gasket filled with LOCA. As above, these measurements were conducted using the Nicolet Nexus FTIR (Thermo Scientific, Waltham, MA), with a 385 nm LED light source (Omnicure LX400).

A baseline IR spectra was taken before cure. The sample was exposed to 385 nm UV LED for 20 seconds in the same configuration as described above. Then, the black tape was removed, and IR was measured every 0.5 mm from the center of the exposure window to measure the lateral extant of the functional cure. The measurements extended until the limits of the sample cell or until a spectra showed no cure.

Cure Analysis of LOCA with Photorheometry

A DHR-2 rheometer (TA Instruments, New Castle, DE) with UV LED curing apparatus was used for photorheological analysis. The UV LED source was a 365 nm LED with 50 mW/$cm^2$ UV-A output. The geometry is a 20 mm disposable aluminum upper plate and a 20 mm disposable UV transparent acrylic lower plate. A LOCA sample is placed on the lower plate, and the gap is trimmed to 500 μm thick, removing excess adhesive that has oozed out of the gap. The sample is analyzed at 5 Hz, obtaining a baseline for 30 seconds, followed by a 40 second UV LED dose, and an additional data capture of 110 seconds after the UV LED is turned off.

Gel Stability of LOCA Formulations

Formulations were placed in a 50° C. oven followed by visual observations for gel content after 24 hours and 48 hours for gels. Gel content is reported as either present or absent after exposures. A mixture comprising monomer and photoacid generator and TEB-DAP gave gel.

Optical Properties Haze, Transmission and Color

Optical properties of the LOCA materials were measured by sandwiching the LOCA mixture between 2"×3" LCD glasses (Eagle 2000 from Corning Display Technologies, Corning, NY) at a thickness of about 150 microns and then curing with the total energy of 3 J/cm$^2$ in UV-A region under a Fusion UV lamp (Fusion UV Systems INC. Gaithersburg, Maryland) using a quartz UV D bulb. The thickness of the LOCA sample was controlled by using one layer of 3M (St. Paul, MN) Scotch 898 filament tape along the edges of one of the substrates. Haze, transmission and color of the cured LOCAs were measured before and after aging under environmental testing conditions using a HunterLab UltraScan PRO (Hunter Associates Laboratory, Inc, Reston, Virginia). The color coordinates are reported by conventional CIE parameters L* (lightness), a* (red/green coordinate) and b* (yellow/blue coordinate).

Example Overview

The formulations for the Examples were all constituted from admixture of the base acid, or Preparatory Liquid Optically Clear Adhesive Formulation (PLOCA below), a super acid, photosensitizer and a trialkyl borane complex initiator.

Preparation of Preparatory Liquid Optically Clear Adhesive Formulation (PLOCA-1)

In the first step of the polymerization, a stainless steel reaction vessel was charged with 55 parts per hundred (pph) of 2-ethylhexyl acrylate (2-EHA), 25 pph isobornyl acrylate (IBOA), 20 pph hydroxyethyl acrylate (HEA), 5.4 pph isooctyl thiolglycolate (IOTG), 0.02 pph MEHQ, 0.05 pph BHT, and 0.0175 pph Vazo 52. The reactor was sealed and purged of oxygen and then held at approximately 5 psig (34.5 kPa) nitrogen pressure. The reaction mixture was heated to an induction temperature of 60° C. and the polymerization reaction proceeded adiabatically, peaking at approximately 153° C. When the reaction was complete, the mixture was cooled to 60° C.

In the second step of polymerization, 1.8 pph IOTG, 0.02 pph Vazo 52, 0.04 pph Vazo 67, 0.05 pph Vazo 88, and 0.75 pph 2-EHA (2-EHA used to dissolve the Vazo 52, Vazo 67, and Vazo 88) was added to the reaction mixture. The reactor was sealed and purged of oxygen and held at 5 psig (34.5 kPa) nitrogen pressure. The reaction mixture was heated to 60° C. and the polymerization reaction proceeded adiabatically, peaking at approximately 115° C. The reaction mixture was then held 3 hours at 115° C. under 5 psig (34.5 kPa) nitrogen pressure.

Next, the mixture was cooled to 70° C. and 4.4 pph of isocyanatoethyl methacrylate (IEM) was added. A slow stream of a mixture of 90/10 nitrogen/oxygen by volume was bubbled through the mixture and it was held at 70° C. for 8 hours.

Preparation of Preparatory Liquid Optically Clear Adhesive Formulation (PLOCA-2)

In the first step of the polymerization, a stainless steel reaction vessel was charged with 74.0 parts per hundred (pph) of tridecyl acrylate (TDA), 26 pph 2-hydroxypropyl acrylate (2-HPA), 5.0 pph alkylsiloxane-treated fumed silica, 2.873 pph isooctyl thiolglycolate (IOTG), 0.02 pph MEHQ, and 0.00165 pph Vazo 52. The reactor was sealed and purged of oxygen and then held at approximately 5 psig (34.5 kPa) nitrogen pressure. The reaction mixture was heated to an induction temperature of 60° C. and the polymerization reaction proceeded adiabatically peaking at approximately 125° C. When the reaction was complete, the mixture was cooled to 60° C. The reaction mixture polymerized to 50.0 solids as determined by gravimetric analysis.

In the second step of polymerization, to the reaction mixture was added 1.768 pph IOTG, 0.025 pph Vazo 52, 0.04 pph Vazo 67, and 0.05 pph Vazo 88. The reactor was sealed and purged of oxygen and held at 5 psig (34.5 kPa) nitrogen pressure. The reaction mixture was heated to 60° C. and the reaction proceeded adiabatically peaking at approximately 113.0 C. Next the mixture was held at 115.0 C for three hours.

Next the mixture was cooled to 90° C. and 3.0 pph (based on 100 parts TDA+HPA) of isocyanatoethyl methacrylate (IEM) was added. A slow stream of a mixture of 90/10 nitrogen/oxygen by volume was bubbled through the mixture and it was held at 90° C. for 2 hours.

Silane A-174 at 0.5 pph, butylated hydroxytoluene at 0.05 pph, Evanstab 13 at 1.0 pph, and TPO-L at 0.1 pph were added prior to draining the product (all based on 100 parts TDA+HPA).

Preparation of Liquid Optically Clear Adhesive (LOCA) Formulation Examples

Each of the example formulations listed in Table 2 were compounded by adding 50.0 g of the PLOCA formulation, the iodonium salt and the photosensitizer to a DAC MAX100 cup. These materials were mixed using a DAC400 Speedmixer (FlackTek, Landrum SC) at 1000 RPM for 30 seconds, 2000 RPM for 90 seconds and 2700 RPM for 8 minutes. 0.5 g of TEB DAP was added to the material in the DAC MAX100 cup. These materials were mixed using a DAC400 Speedmixer at 1000 RPM for 60 seconds.

In Table 2, each formulation was based on 50 g of either base liquid OCA of PLOCA-1 or PLOCA-2. The photoacid generator options included Bis-(4-dodecylphenyl) iodonium SbF$_6$, OPPI and Rhodorsil 2074. The photosensitizer options included ITX and Omnirad 651.

TABLE 2

LOCA example overview

| [grams] Material | Example Formulations | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | Comp A | Comp B | Comp C | Comp D | Comp E |
| PLOCA-1 | 50 | 50 | 50 | 50 | 50 | 50 | 50 | 50 | 50 | 50 | 50 | | | | | |
| PLOCA-2 | | | | | | | | | | | | 50 | 50 | 50 | 50 | 50 |

TABLE 2-continued

LOCA example overview

| [grams] Material | Example Formulations | | | | | | | | | | | Comp A | Comp B | Comp C | Comp D | Comp E |
|---|---|---|---|---|---|---|---|---|---|---|---|---|---|---|---|---|
| | 1 | 2 | 3 | 4 | 5 | 6 | 7 | 8 | 9 | 10 | 11 | | | | | |
| Bis-(dodecylphenyl) iodonium SbF$_6$ | 0.5 | | 0.5 | | | | 1.0 | 0.5 | | | | 0.5 | | 1.0 | | |
| OPPI | | 0.5 | | 0.5 | | | | | 1.0 | 0.5 | 0.5 | | 0.5 | | | 1.0 |
| Rhodorsil 2074 | | | | | 0.5 | | | | | | | | | | | |
| ITX | 0.25 | 0.25 | | | | | | 0.5 | 0.5 | | 0.5 | | | | | |
| Omnirad 651 | | | 0.25 | 0.25 | 0.25 | | | | | | | | | | | |
| Trialkyl Borane Complex Initiator (TEB-DAP) | 0.5 | 0.5 | 0.5 | 0.5 | 0.5 | 1.0 | | 0.5 | | 0.5 | 0.5 | 0.5 | 0.5 | | 1.0 | |

Test Results

Results for cure analysis using FTIR are shown in Table 3 reporting the degree of cure as a function of exposure. As can be seen, the Omnirad 651 shows a more significant degree of double-bond conversion.

TABLE 3

Cure conversion as a function of UV exposure

| Purpose | Material | IS-1 | IS-2 | IS-3 | IS-4 | IS-5 |
|---|---|---|---|---|---|---|
| Photosensitizer | ITX | X | X | | | |
| | Omnirad 651 | | | X | X | X |
| Exposure Time (s) | | 75 | 75 | 20 | 20 | 20 |
| Double-Bond Conversion | | 56% | 56% | 100% | 90% | 100% |

Results for cure propagation experiments are shown in Table 4 where the lateral extent of cure is shown for the various formulations after both initial cure exposure, and 24 hours at 50° C. As can be seen, full cure is observed after 24 hours at 50° C.

TABLE 4

Lateral extent of shadow cure after exposure and after aging

| | IS-3 | IS-4 | IS-5 |
|---|---|---|---|
| Initial Cure | 5 mm | 5 mm | 5 mm |
| 24 hours at 50° C. | Full area | Full area | Full area |

Table 5 shows test results from Photorheometry for the gel point, defined by that point which the storage modulus (G') becomes greater than the loss modulus (G"). As can be seen, IS-3 and IS-4 exhibit a crossover point, whereas IS-5 does not demonstrate this.

TABLE 5

Crossover point determined with photorheometry

| | IS-3 | IS-4 | IS-5 |
|---|---|---|---|
| Crossover Point (mJ/cm$^2$) | 1495 | 1380 | None observed |

Table 6 shows optical property measurements from the cured LOCAs, showing haze <0.2, b*<0.4 and transmission (uncorrected) of >90%.

TABLE 6

Optical properties of cured LOCA

| | L* | a* | b* | Haze (%) | Transmission (%) |
|---|---|---|---|---|---|
| IS-3 | 96.79 | −0.08 | 0.39 | 0.1 | 90.4 |
| IS-4 | 96.77 | −0.06 | 0.32 | 0.1 | 90.5 |
| IS-5 | 96.83 | −0.05 | 0.33 | 0.15 | 90.8 |

Table 7 shows room temperature shelf stability from LOCAs, with fully formulated materials (containing LOCA, photosensitizer, trialkyl borane complex initiator, and super-acid) being stable only if they are substantially free of (meth)acrylate monomer. Comparative Examples A and B, where all components are present (LOCA+cationic photoinitator+trialkyl borane) with the addition of monomers, are not stable and will gel. Comparative Example C is not substantially free of monomer, contains the cationic photoinitiator but lacks the trialkyl borane. It is stable because it does not have the trialkyl borane to cause the reaction. Comparative Example D is not substantially free of monomer, contains the trialkyl borane but lacks the cationic photoinitiator. It is stable because it does not have the cationic photoinitiator present. Comparative Example E is not substantially free of monomer, contains the cationic photoinitiator but lacks the trialkyl borane. It is stable because it does not have the trialkyl borane to cause the reaction.

TABLE 7

Room temperature shelf stability from LOCAs

|  | EX6 | EX7 | EX8 | EX9 | EX10 | EX11 | CEX. A | CEX. B | CEX. C | CEX. D | CEX. E |
|---|---|---|---|---|---|---|---|---|---|---|---|
| Substantially free of (meth)acrylate monomer | Yes | Yes | Yes | Yes | Yes | Yes | No | No | No | No | No |
| Gelation observed after 24 hr at 23° C. | No | No | No | No | No | No | Yes | Yes | No | No | No |

Although the present invention has been described with reference to preferred embodiments, workers skilled in the art will recognize that changes may be made in form and detail without departing from the spirit and scope of the invention.

What is claimed is:

1. An optically clear adhesive composition comprising:
    a free-radically polymerizable acrylate or meth(acrylate) functional acrylic oligomer;
    a trialkyl borane-amine complex initiator, wherein the amine is decomplexed by reaction with a superacid to initiate polymerization of the free-radically polymerizable acrylate or meth(acrylate) functional acrylic oligomer;
    a photoacid generator that generates a superacid upon exposure to actinic radiation; and
    a photosensitizer wherein the photosensitizer absorbs light and transfers energy or an electron to the photoacid generator,
    wherein the photosensitizer is a benzoin ether,
    wherein a viscosity of the composition immediately after mixing and a viscosity of the composition about 24 hours after mixing changes by less than about 10%.

2. The optically clear adhesive composition of claim 1, wherein the optically clear adhesive composition is one of a liquid optically clear adhesive and a post-UV curable optically clear adhesive film.

3. The optically clear adhesive composition of claim 1, wherein the photoacid generator generates a superacid upon exposure to actinic radiation.

4. The optically clear adhesive composition of claim 1, wherein the photoacid generator comprises one of diaryliodonium salts, triarylsulfonium salts, dialkylphenacylsulfonium salts, and dialkyl-4-hydroxyphenylsulfonium salts.

5. The optically clear adhesive composition of claim 1, wherein the optically clear adhesive composition comprises between about 0.01 wt % and about 10 wt % trialkyl borane complex initiator.

6. The optically clear adhesive composition of claim 1, wherein the optically clear adhesive composition comprises between about 0.01 wt % and about 10 wt % photoacid generator.

7. The optically clear adhesive composition of claim 1, wherein the optically clear adhesive composition comprises between about 0.01 wt % and about 5 wt % photosensitizer.

8. The optically clear adhesive composition of claim 1, wherein the optically clear adhesive composition is a one-part system.

9. The optically clear adhesive composition of claim 1, wherein the composition comprises less than about 5% monomer.

10. The optically clear adhesive composition of claim 1, wherein the composition comprises less than about 5% low molecular weight reactive species.

11. The optically clear adhesive composition of claim 1, wherein when the optically clear adhesive composition is placed between two substrates and made into a laminate, wherein at least one of the substrates is transparent, the laminate has a haze of less than about 5%, a transmission of greater than about 80%, and an optical clarity of greater than about 95% when cured.

12. A method of curing under an ink step, the method comprising:
    positioning an optically clear adhesive composition at least partially beneath the ink step, wherein the optically clear adhesive composition comprises:
        a free-radically polymerizable acrylate or meth(acrylate) functional acrylic oligomer;
        a trialkyl borane-amine complex initiator, wherein the amine is decomplexed by reaction with a superacid to initiate polymerization of the free-radically polymerizable acrylate or meth(acrylate) functional acrylic oligomer;
        a photoacid generator that generates a superacid upon exposure to actinic radiation; and
        a photosensitizer wherein the photosensitizer absorbs light and transfers energy or an electron to the photoacid generator,
        wherein the photosensitizer is a benzoin ether,
        wherein a viscosity of the composition immediately after mixing and a viscosity of the composition about 24 hours after mixing changes by less than about 10%; and
    exposing the optically clear adhesive composition to actinic radiation to cure the optically clear adhesive composition under the ink step.

13. The method of claim 12, wherein exposing the optically clear adhesive composition to actinic radiation generates a superacid.

14. The method of claim 12, wherein the photoacid generator comprises one of iodonium salts, diaryliodonium salts, triarylsulfonium salts, dialkylphenacylsulfonium salts, and dialkyl-4-hydroxyphenylsulfonium salts.

15. The method of claim 12, wherein the composition is substantially free of monomer and low molecular weight reactive species.

16. A laminate comprising:
    a first substrate;
    a second substrate; and
    an optically clear adhesive composition positioned between and in contact with the first substrate and the second substrate, wherein the optically clear adhesive layer is derived from precursors that comprise:
        a free-radically polymerizable acrylate or meth(acrylate) functional acrylic oligomer;
        a trialkyl borane-amine complex initiator, wherein the amine is decomplexed by reaction with a superacid to initiate polymerization of the free-radically polymerizable acrylate or meth(acrylate) functional acrylic oligomer;

a photoacid generator that generates a superacid upon exposure to actinic radiation; and a photosensitizer wherein the photosensitizer absorbs light and transfers energy or an electron to the photoacid generator, wherein the photosensitizer is a benzoin ether, wherein a viscosity of the composition immediately after mixing and a viscosity of the composition about 24 hours after mixing changes by less than about 10%.

17. The laminate of claim 16, wherein at least one of the first and second substrates is optically clear.

18. The laminate of claim 16, wherein exposing the optically clear adhesive composition to actinic radiation generates a superacid.

19. The laminate of claim 16, wherein the laminate has a haze of less than about 5%, a transmission of greater than about 80%, and optical clarity of greater than about 95% when cured.

\* \* \* \* \*